April 6, 1965    B. W. BATES    3,176,656
ANIMAL WATERING AND/OR FEED TROUGH
Filed July 22, 1963
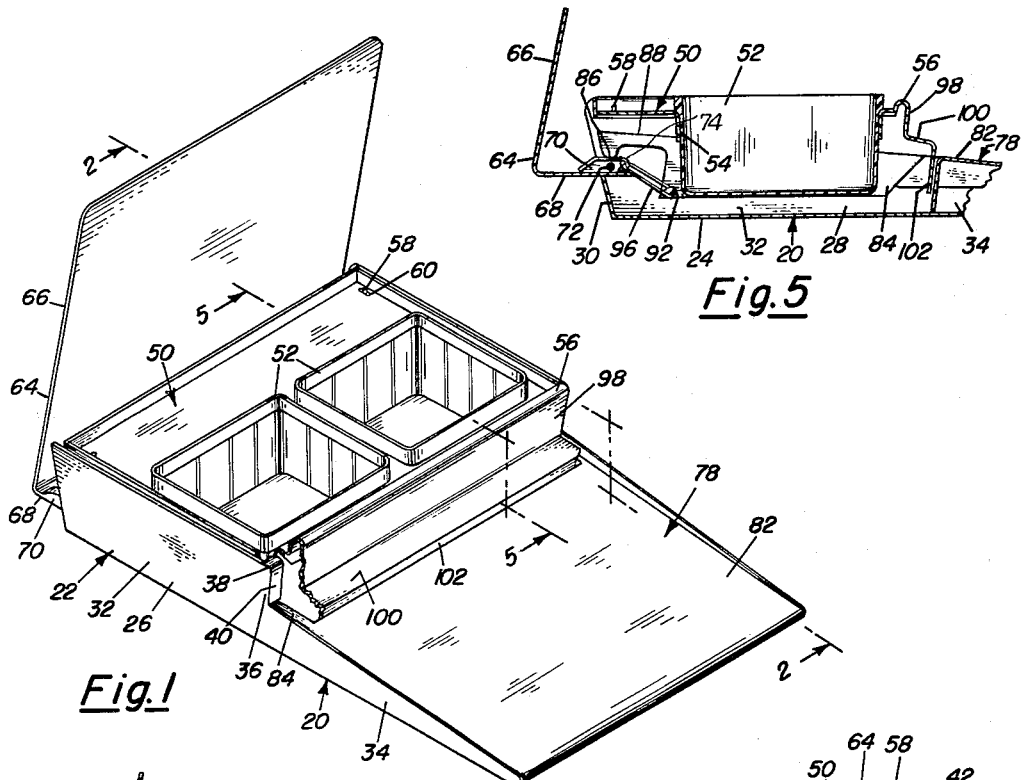
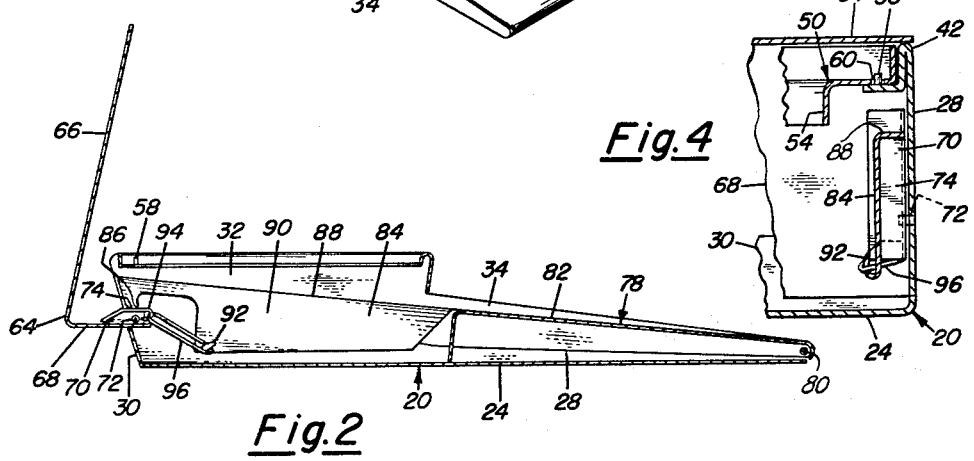
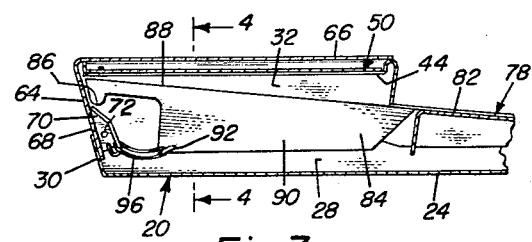
INVENTOR.
BENJAMIN W. BATES
BY
ATTORNEYS

United States Patent Office 3,176,656
Patented Apr. 6, 1965

3,176,656
ANIMAL WATERING AND/OR FEED TROUGH
Benjamin W. Bates, 4589 College Ave., San Diego 15, Calif.
Filed July 22, 1963, Ser. No. 296,839
8 Claims. (Cl. 119—62)

The present invention relates to an animal watering and/or feed trough and more particularly to one useful for feeding pet animals such as dogs and cats.

The watering or feed trough comprises a frame which is supported by a floor. An open top container is, or a plurality of open top containers are, supported by the frame. A lid is provided for the open top container and is supported for pivotal movement on a horizontal axis on the rear of the frame. A lever forming a platform for the paws of the animal is pivoted on a horizontal axis at the front of the frame. The rear end of the lever is in the form of a camming surface which is engageable with the lid for lifting the lid open depressing of the platform by the animal that desires to be fed. Resilient means are connected with the lid and the lever and yieldingly urge the lid toward closed position when the lid is in fully opened position. However, the weight of the animal on the platform overcomes this resilient means.

In the preferred embodiment of the invention the yielding means is in the form of rubber bands which can be readily replaced.

Also, in the preferred form of the invention, the lever forming the platform is provided with two rearwardly extending arms formed integrally with the platform. One of these arms is disposed adjacent one inside wall of the frame and the other arm is disposed adjacent the opposite inside wall of the frame. Each arm is provided with a camming surface at the rear thereof which is adapted to engage a downwardly extending portion of the lid. Also in the preferred embodiment, a pair of resilient means is provided, one being connected with one of the arms of the lid and the other being connected with the other arm of the lid.

Also in the preferred embodiment of the invention, the effective lengths of the rubber bands and the connection between the opposite ends of the rubber bands with the lid and lever are such that the rubber bands are ineffective after the lid is moved a predetermined distance during the closing movements thereof whereby the weight of the lid alone effects the movement of the lid to the container closing position.

Other features and the advantages of the present invention will be apparent from the following description, reference being had to the accompanying drawing wherein a preferred embodiment of the invention is illustrated.

In the drawing:

FIG. 1 is a perspective view of the trough showing the platform in a depressed position in which position the lid is in an opened position, part thereof being broken away.

FIG. 2 is a longitudinal sectional view taken along line 2—2 of FIG. 1;

FIG. 3 is a fragmentary view similar to FIG. 2 but showing the platform in raised position and the lid in closed position.

FIG. 4 is a fragmentary sectional view taken along the line 4—4 of FIG. 3 but on a larger scale; and FIG. 5 is a fragmentary sectional view taken along line 5—5 of FIG. 1.

Referring more in detail to the drawing, the trough is shown at 20. It includes a frame 22 having a bottom wall 24, integrally formed left and right side walls 26 and 28, and a rear wall 30. These walls 26 and 28 are allochiral with respect to one another. It will be observed that the rear portion of each of these walls extends higher than the front portion thereof. The higher portion is indicated at 32 and the lower portion at 34. At the junction of these two portions the material is bent inwardly to form wings 36 and the top thereof is curved as at 38 and then the bent portion extends downwardly as shown at 40.

Referring more particularly to FIG. 4, it will be seen that the upper end of the side portion 32 is bent downwardly as at 42 and then inwardly as at 44 whereby the portions 44 provide ledges.

A tray 50 is supported by the ledges 44. This tray may be provided with one or more integrally formed containers or the container may be formed separately from the tray and removably carried by the tray. The containers are herein shown at 52, the tray being provided with openings 54 for receiving the trays. The tray also includes a transversely extending channel 56 which rests upon the portions 38 and the wings 36.

Ledges 44 are provided with upwardly extending pins 58 which extend through slots 60 in the rear of the tray for assisting locating the tray.

The lid 64, when closed, includes a top portion 66, a downwardly extending portion 68 and forwardly extending wings 70. These wings are supported by the same frame members 32 for pivotal movement about a horizontal axis upon pivots 72. The forward ends of the wings 70 are provided with inwardly extending sections 74 adapted to be engaged for swinging the lid in a counterclockwise direction as found in the drawing.

A lever 78 is disposed between the sides 26 and 28. It is supported by the frame for pivotal movement about a horizontal axis upon a rod 80 carried at the extreme forward end of the frame. This lever 78 provides a platform 82 at the front of the trough. The lever includes a pair of arms 84, formed integrally with the platform 82, one of these arms being disposed adjacent the inside wall of one of the walls 32 and the other of these arms is disposed alongside of the other of the walls 32. The extreme rear ends 86 of the arms 84 are adapted to slidably engage the surface 74 of the wings 70 when the platform and arms are depressed. This engagement will cause the lid to be moved in a counterclockwise direction about its pivots 72. The top of the arms 84 are bent inwardly as at 88 and then downwardly as at 90 for the dual purpose of reenforcing the arms and also providing a hook 92.

Resilient means in the form of rubber bands 96 are connected to the hooks 92 and hooks 94 formed at the lower end of the wings 70.

When the animal steps upon the platform 82, the levers 78 together with the platform 82 and the arm 84 will be moved downwardly, i.e. in a counterclockwise direction. As found in the drawing, the extreme end 86 of the arms 84 will engage the sections 74 of the wings 70 and force the lid to move in a counterclockwise direction whereby the lid is moved from the position shown in FIG. 3 to the position shown in FIG. 2, thus causing a stretching of the rubber bands 96. These rubber bands when so stretched yieldingly urge the lid to move in a clockwise direction when the lid is in the fully opened position. Consequently, when the weight of the animal is removed from the platform, the lever 78 and the lid 64 are moved clockwise by the bands 96 at least to the right of the dead center position of the lid with respect to the pivots 72. The effective lengths of the rubber bands and the connection between the ends thereof with the lid and lever are such that the rubber bands are ineffective after the lid is moved a predetermined distance during the closing movement thereof whereby the lid will fall into closing position through its own weight. The purpose of this is to prevent speedy movement of the lid toward closing position by additional resilient means, which speedy movement is quite apt to scare the animal.

As will be seen more clearly from FIG. 5, the tray 56 is provided with a downwardly extending portion 98, a forwardly extending portion 100 and downwardly extending portion 102. These portions close the gap between the rear end of the platform 82 and the rear hollow portion of the frame, such design being provided to prevent food articles from dropping inside the frame and also for improving the asthetic appearance of the trough.

While the form of embodiment herein shown and described constitutes a preferred form it is to be understood that other forms may be adopted falling within the scope of the claims that follow.

I claim:

1. A trough such as a watering or feeding trough for an animal, such as a dog or cat, comprising in combination:
    (A) A frame adapted to rest on the floor;
    (B) an open top container for food or water removably supported at the rear of the frame;
    (C) a lid disposed above the container for closing the container;
    (D) means on the rear of the frame supporting the lid for pivotal movement on a horizontal axis;
    (E) a lever forming a platform at the front thereof;
    (F) means on the front of the frame supporting the lever for pivotal movement on a horizontal axis, said lever having:
        (1) a rearwardly extending surface slidably engageable with the lid for lifting the lid away from the container upon depressing of the platform;
    (G) and resilient means connecting the lid and lever and yieldingly urging the lid toward closed position when said lid is in fully open position, the effective length of the resilient means and the connection between the ends of the resilient means and the lid and lever is such that the resilient means is ineffective after the lid is moved a predetermined distance during the closing movement thereof.

2. A through as defined in claim 1, characterized in that the resilient means comprises a rubber band.

3. A trough as defined in claim 1, characterized in that the lid is provided with a downwardly extending portion at the rear of the frame; that the means on the rear of the frame supporting the lid for pivotal movement cooperates with the bottom of the downwardly extending portion of the lid; and that the engaging surface on the lever cooperates with said downwardly extending portion of the lid.

4. A trough as defined in claim 3, characterized in that the resilient means comprises a rubber band.

5. A trough such as a watering or feeding trough for an animal, such as a dog or cat, comprising in combination:
    (A) A frame adapted to rest on the floor;
    (B) an open top container for food or water removably supported at the rear of the frame;
    (C) a lid disposed above the container for closing the container;
    (D) means on the rear of the frame supporting the lid for pivotal movement on a horizontal axis;
    (E) a lever forming:
        (1) a platform, and
        (2) a pair of rearwardly arms formed integrally with the platform, one of said arms being disposed adjacent and interiorly of one side of the frame and the other arm being disposed adjacent and interiorly of the opposite side of the frame,
    (F) means on the front of the frame supporting the lever for pivotal movement on a horizontal axis, said arms of the lever each having:
        (1) a surface slidably engageable with the lid for lifting the lid away from the container upon depressing of the platform;
    (G) and a plurality of resilient means, one of said resilient means connecting the lid and one of the arms of the lever, and the other of said resilient means connecting the lid and the other arm of the lever, the effective lengths of the resilient means and their respective connection between the ends of a resilient means and the lid and a lever is such that the resilient means are ineffective after the lid is moved a predetermined distance during the closing movement thereof.

6. A watering and feeding trough as defined in claim 5, characterized in that the resilient means each comprises a rubber band.

7. A watering and feeding trough as defined in claim 5, characterized in that the lid is provided with a downwardly extending portion at the rear of the frame; that the means on the rear of the frame supporting the lid for pivotal movement cooperates with the bottom of the downwardly extending portion of the lid; and that the engaging surfaces on the arms of the lever cooperate with said downwardly extending portion of the lid.

8. A trough as defined in claim 7, characterized in that the resilient means comprises a rubber band.

References Cited by the Examiner

UNITED STATES PATENTS

| 1,454,352 | 5/23 | Thompson | 119—55 |
| 2,555,396 | 6/51 | Cosner | 119—51.5 |

FOREIGN PATENTS

| 472,801 | 9/37 | Great Britain. |

SAMUEL KOREN, *Primary Examiner.*

HUGH R. CHAMBLEE, *Examiner.*